(12) United States Patent
Van Gaasbeck

(10) Patent No.: US 10,810,132 B1
(45) Date of Patent: Oct. 20, 2020

(54) OBJECT BASED EXTENT MAPPING FOR FLASH MEMORY

(71) Applicant: EMC Corporation, Hopkinton, MA (US)

(72) Inventor: Richard H. Van Gaasbeck, Mountain View, CA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 71 days.

(21) Appl. No.: 15/084,996

(22) Filed: Mar. 30, 2016

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1044* (2013.01); *G06F 2212/2022* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 6,038,636 A | * | 3/2000 | Brown, III | G06F 12/0246 711/103 |
| 2010/0100667 A1 | * | 4/2010 | Kang | G06F 12/0246 711/103 |
| 2014/0195725 A1 | * | 7/2014 | Bennett | G06F 12/0246 711/103 |

* cited by examiner

*Primary Examiner* — Gary W. Cygiel
(74) *Attorney, Agent, or Firm* — Barry N. Young

(57) ABSTRACT

Logical to physical mapping of managed units ("MUs") of object data in a flash memory system storing MUs that are being created continuously by applications running on a client system is maintained in an extent based tree in DRAM for extents of contiguous MUs and in an override tree in DRAM for individual MUs. Extent mapping data in the extent tree for extents comprises a starting address and a length. Mapping data for individual MUs in the override tree comprises individual pointers from logical addresses to physical addresses. Source erase blocks in flash memory are reorganized asynchronously by iteratively moving individual MUs of an object in order from a source erase block to a free erase block to empty the source erase block and free up associated DRAM.

13 Claims, 4 Drawing Sheets

OBJECT BASED EXTENT MAPPING FOR FLASH MEMORY

BACKGROUND

This invention relates generally to non-volatile memory (NVM), and more particularly to the management of NVM systems such as flash memory to improve its organization and accessibility.

Non-volatile semiconductor-based flash memory, such as NAND flash, is being used increasingly in solid state drives (SSD) as primary memory in computer systems in place of rotating magnetic disk drives. As flash memory technology improves, flash is becoming fast, inexpensive and dense, and has the advantage of being persistent without the necessity of applied power. NAND flash has the disadvantage, however, of not permitting overwriting of data in place. To update previously written data, a whole data block of flash must be erased before it can be rewritten. Additionally, as data is continuously being updated and rewritten to new locations, over time many data locations in an original source data block will contain invalid data, and available locations in a new block will be consumed by updated data which reduces the available usable memory. To increase available memory, an original source data block must be erased and reclaimed, which requires that any valid data in that block be moved to new locations before erasing the block.

When existing data stored in flash changes, it cannot be overwritten in place with new data. The new data must be written to a new unused location, and a logical to physical mapping must be maintained to point to the data in its new location to enable it to be accessed. Both actions increase system overhead. DRAM is typically used for the mapping. One cost of mapping is the amount of DRAM necessary. One physical address must be stored for each logical address. Often the size of the storage (referred to as a managed unit or MU) represented by one logical address is equal to a flash page, but other sizes, for instance 4 kB, may also be used. Applications generally write object data in multiples of MU sizes. While a flash memory system could be accessed via a single logical to physical map, it is useful to divide up the flash memory into portions and assign different portions to different objects. Each object would then have its own logical to physical map. While a simple logical to physical map might be a single array of physical addresses indexed by logical address, a more flexible map avoids allocating a single contiguous piece of DRAM and more efficiently handles sparse objects by representing the map using a tree of fixed size map segments in a way that is similar to the way operating system page tables work.

As flash memory technology improves, the amount of storage per flash device has been steadily increasing. While DRAM memory technology has also been improving, it has not improved as fast as flash memory. In a typical logical to physical map implementation, the ratio of DRAM storage required for the map to flash storage is fixed. For instance, with a 4 kB MU and a four-byte address, the ratio would be one byte of DRAM per 1000 bytes of flash. Because the density of DRAM is not improving as fast as flash, enhancing a flash system to use a new generation of flash may require not only changing the DRAM to a new generation, it may also require using more DRAM devices, which is undesirable. Since DRAM does not increase the usable capacity of a storage device, it is desirable to keep costs down by minimizing the amount of DRAM used for mapping in a system.

It is desirable to provide systems and methods for managing flash memory that address the foregoing and other problems associated with flash memory and that improve the efficiency of flash memory systems, and it is to these ends that the invention is directed.

DESCRIPTION OF PREFERRED EMBODIMENTS

The invention is especially well adapted for use with flash memory and will be described in that context. As will be appreciated, however, this is illustrative of one utility of the invention, and the invention may also be used for managing other types of memory.

Figure 1:
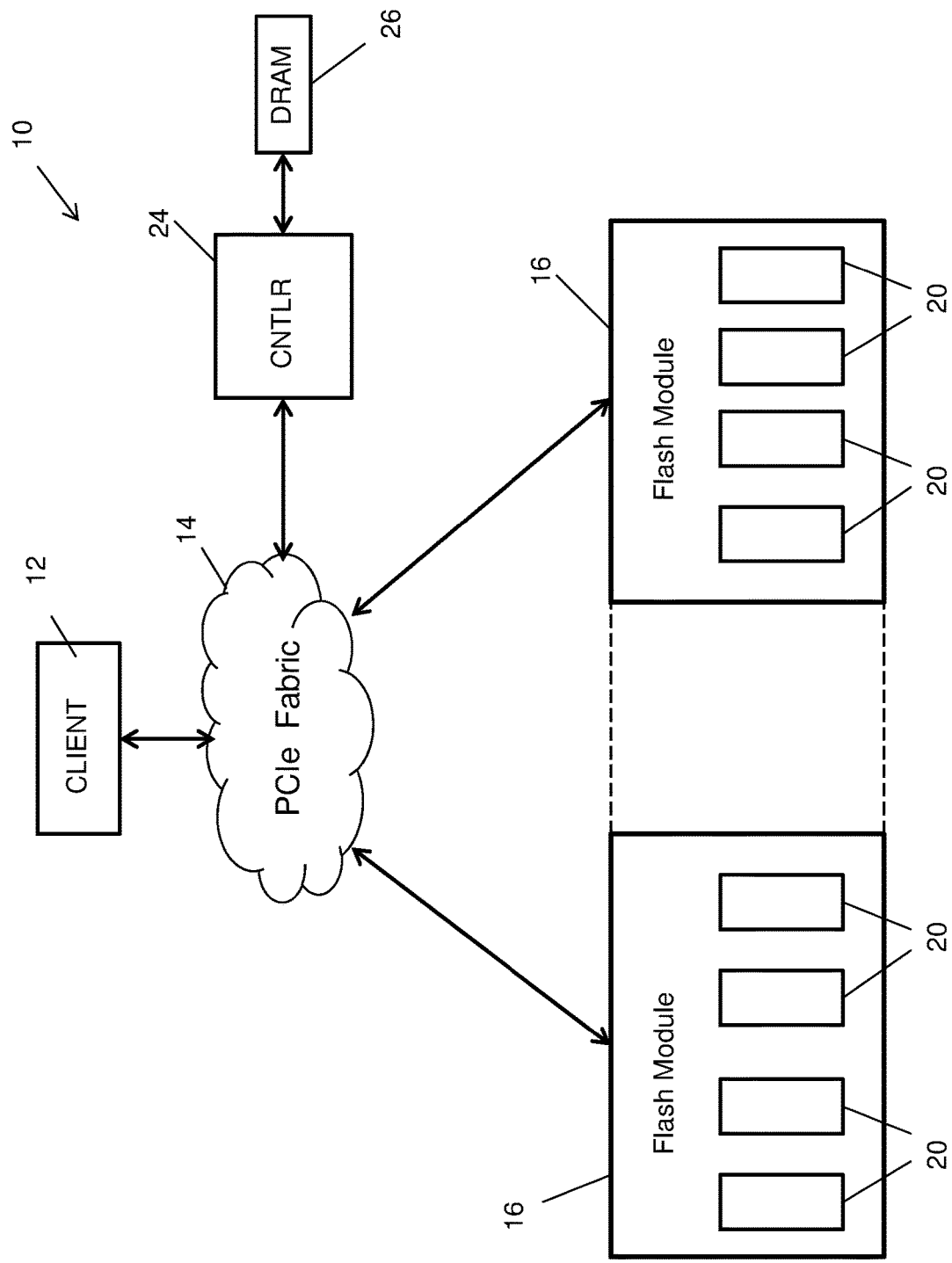
FIG. 1 is a block diagram of a flash memory system of the type with which the invention may be employed.

FIG. 1 illustrates one type of a non-volatile flash memory system 10 with which the invention may be used. The memory system may be connected to a client computer 12 by an interface, such as a peripheral component interconnect express (PCIe) fabric 14, to a plurality of non-volatile flash memory modules 16, two such modules being shown in the figure. The client computer 12 comprises a computer processor and memory, and may run multiple applications that store object data as it is created on flash memory. Each flash memory module may have a plurality of flash memory devices 20. A central controller 24 comprising a microprocessor may have associated DRAM 26 and non-volatile program memory (not explicitly shown) that stores computer readable instructions for controlling the microprocessor to perform the operations described herein, may be connected to the fabric 14 for controlling the flash devices. The flash devices may each comprise non-volatile NAND flash memory media, for example, that store data values without the necessity of electrical power to retain the values. The flash devices may generally comprise a plurality of flash die, each of which may comprise flash blocks and pages. The controller may perform reads and writes to the flash such that they proceed across flash die, channels, blocks and pages in ways that maximize bandwidth and minimize latency. Each flash device 20 may be a separately mapped unit of flash memory that stores one or more objects, and the DRAM 26, as will be described, may store the logical to physical mappings for each device.

As will be described, a method and a system in accordance with the invention arranges for most mapping units (MUs) of data of an object to be written contiguously into or reorganized into a small number of contiguous areas on the flash, and maps logical addresses to physical addresses of MUs in DRAM. Each contiguous area will be referred to herein as an "extent" that can be represented by a start address and a length of contiguous addresses of ordered MUs of one object that are written by an application, and the groups of extents will be mapped in an "extent tree". When the extents are large, the DRAM required to store starting addresses and lengths of a small number of extents is much smaller than a tree of maps that map each logical address to a physical address, thereby reducing the amount of DRAM required to map a given amount of flash using an extent tree.

Flash devices have ordering requirements such that it is not possible to skip around or reserve physical space when writing to flash. Generally, it may not be practical to write the data for an object contiguously on flash since writes to flash are performed by applications which may write managed units randomly, or if two or more applications are writing at the same time, they may write managed units interleaved on flash. Thus, it is generally not possible for all of the managed units of an object to be laid down contiguously on flash. Rather, managed units will typically be written to flash in the order in which they are they arrive. In an embodiment, individual MUs may be arranged by the controller so that similar sized MUs are grouped together to minimize wasted space.

Since all of the managed units of an object will generally not be written contiguously to or will not remain physically contiguous on flash, the invention employs a hybrid approach for mapping that uses both an extent tree and an override tree. The extent tree may comprise a hierarchical data structure having a small number of leaf data structures that store pointers to the starting addresses of extents (groups of contiguous MUs) and information as to the lengths of the extents. In contrast, the override tree stores exceptions to the extents of MUs in the extent tree. It may comprise hierarchical data structures having leaves that point to the locations of single individual MUs which may be randomly located on the flash. To determine the physical address corresponding to a logical address, the override tree may be consulted first. If there is no entry in the override tree, the extent tree may be consulted next. If there is no entry in either place, the address has yet to be written.

As previously written MUs are overwritten or deleted logically by applications and new MUs are written to flash, an extent previously written may no longer represent a contiguous length of valid MUs, and the extent becomes an incomplete representation of the location of the data. It is not possible to erase and rewrite individual storage locations or pages of flash memory. Flash can only be erased in fixed sized blocks referred to as erase blocks. Accordingly, as applications continue to write to flash, object data becomes more randomly distributed. To address this, the invention affords an efficient low cost method which, as will be described, rearranges and reorganizes MUs in flash into contiguously ordered MUs to "straighten" the data and form new extents.

Figure 2:
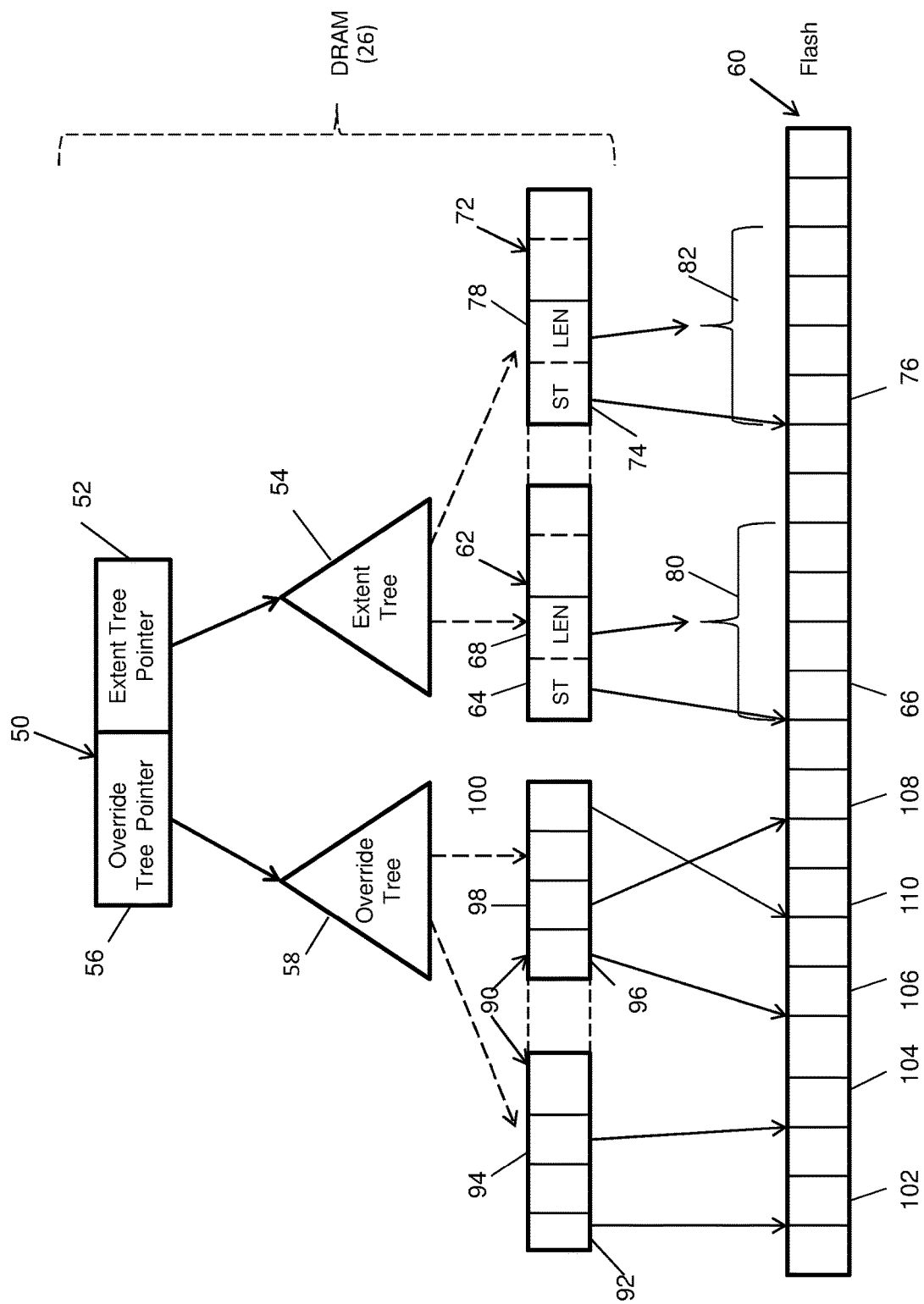
FIG. 2 is diagrammatic view illustrating a method of logical to physical flash address mapping for an object in accordance with an embodiment of the invention.

FIG. 2 illustrates diagrammatically a method in accordance with the invention of organizing and mapping MUs of an object in flash. As shown, an object 50 may contain a pointer 52 to an extent tree 54 and a pointer 56 to an override tree 58 which provide mapping data for mapping logical addresses to physical addresses in a flash memory block 60 storing an array of mapping units. A mapping unit comprises data of one object that is written by one application to flash 60. Applications write in multiples of MU size, e.g., 4 kB, and start at boundaries of an MU. The MUs of one object may all be the same size, but the MUs of different objects need not be the same size. Each MU corresponds to data from one application, as does an extent of MUs of one application, which stay together on flash. The invention preferably organizes writes to flash so that, if possible, MUs of contiguous data from a single application are arranged and written into contiguously locations in flash as an extent, such that the extent of data may be mapped as a starting address location and a length. This extent tree mapping data may be stored in DRAM 26 of the storage system by controller 24, as indicated in FIG. 2.

Extent tree 54 may comprise hierarchical data structure comprising a plurality of leaf data structures 62, 72, each of which may store mapping data 64, 74, respectively, comprising a pointer to a flash block and to the starting addresses of MUs 66, 76, respectively, and a corresponding length 68, 78 of a respective extent 80, 82 in flash memory block 60. Each leaf data structure 62, 72 may store mapping data for more than one extent, and there may be a plurality of such data structures in the extent tree 54. The number of extent data structures and the DRAM necessary to store them are substantially smaller than the DRAM that otherwise would be necessary to store maps of individual logical addresses to individual physical addresses. Additionally, the time required for accessing locations for reading and writing data will also be much less. The larger the extents, the smaller will be the DRAM necessary to store the mapping data, and the more efficient and faster will be the access.

The override tree 58, as described above, provides mapping information about individual managed units (MUs) that are not part of an extent. The leaves of the tree 58 may comprise a plurality of data structures 90, which may all be of the same size, that provide logical to physical mapping data for each such individual MU. Each leaf data structure may comprise pointers 92, 94, 96, 98 and 100 to corresponding physical addresses 102, 104, 106, 110 and 108 of each individual MU in the flash memory 60.

FIG. 2 shows an example of an arrangement of a flash memory block or blocks 60 at a particular time. As shown in FIG. 2, the flash memory 60 will comprise both extents of contiguous MUs of objects and individual MUs. Since applications running on client 12 will be continually updating previously written data and writing new data to the flash memory, the state of the flash memory will be continuously changing and data for objects may increasingly become more randomly distributed. As previously noted, it is desirable to reduce the randomness of data in the flash memory and the DRAM required for mapping it by organizing MUs of objects contiguously ordered into extents. It is also desirable to remove invalid MUs that have been overwritten from memory, similar to a garbage collection operation. This cannot, however, be done in-place on flash memory. Accordingly, asynchronously to client write operations, the invention employs a reorganization process, as described below, to rearrange and straighten MUs of objects in flash into extents by moving them to locations such that the data for each object is as contiguous as possible and in a small number of extents, and to remove invalid MUs in the process. This allows representing an object with a fewer number of extents and individual MUs, and frees up DRAM used to store the override tree.

Because flash erases entire blocks at one time, memory locations containing overwritten invalid MUs cannot be physically erased individually and reused. Source erase blocks may not be erased until they are completely empty. To free a source erase block for reuse and to reorganize (straighten) data into contiguous extents, valid MUs may be moved into erased (free) flash blocks to empty the old source erase block so that the old source erase block may be erased. Data moved to form a new extent may come from many different blocks. This may leave some source blocks from which the data was moved less full, but not empty. Thus, they may not be erased until they are completely empty. The invention affords an efficient method of selecting objects to move and an order in which to move them to completely empty and free blocks quickly enough to provide a sufficient number of empty blocks into which to write extents and new data. The order is preferably selected to minimize multiple movements of any one MU to avoid increasing overhead.

Figure 3:
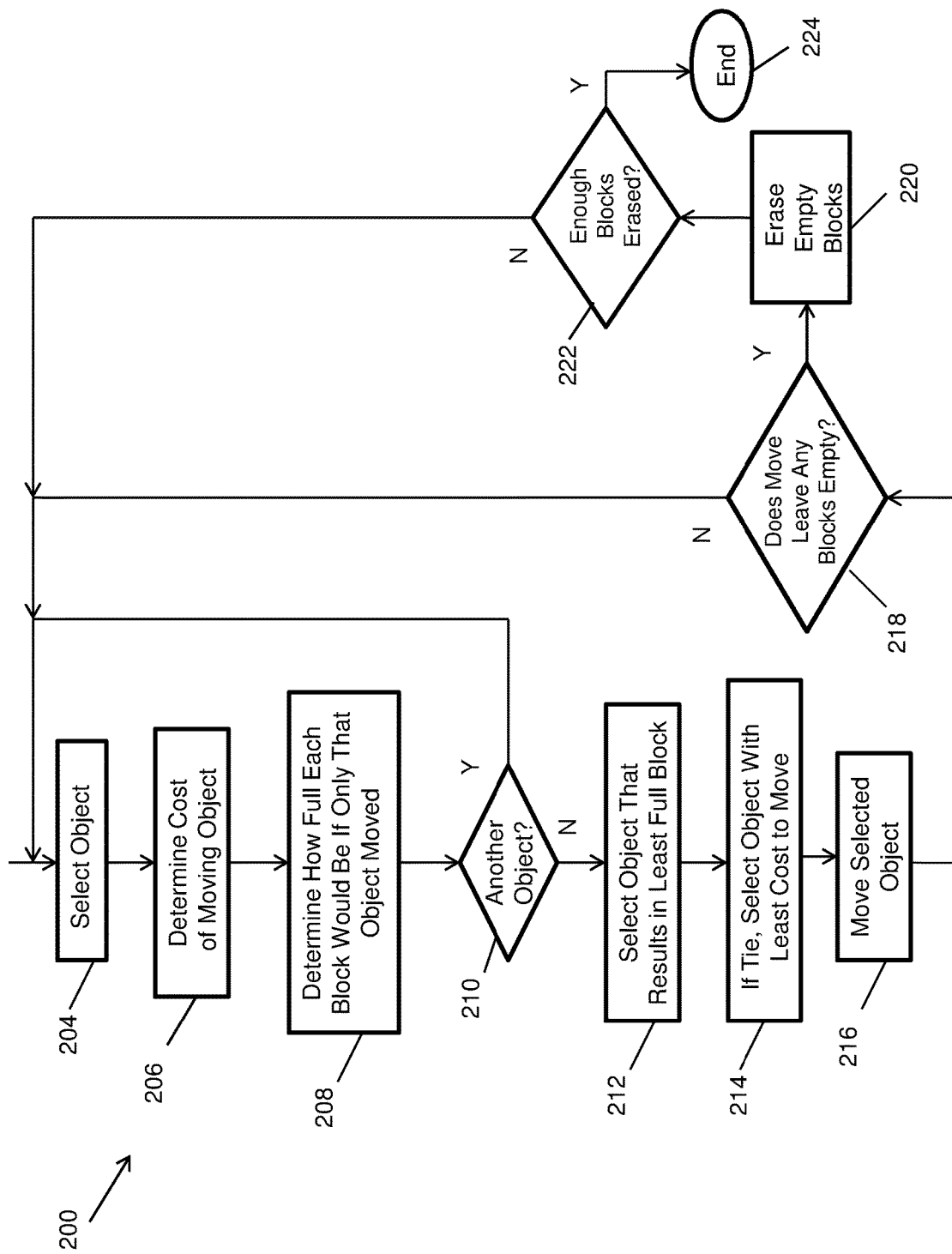
FIG. 3 is a flow diagram that illustrates an embodiment of a selection and reorganization process in accordance with the invention for selecting objects to move and reorganize to minimize DRAM requirements and free erase blocks for reuse.
Figure 4:
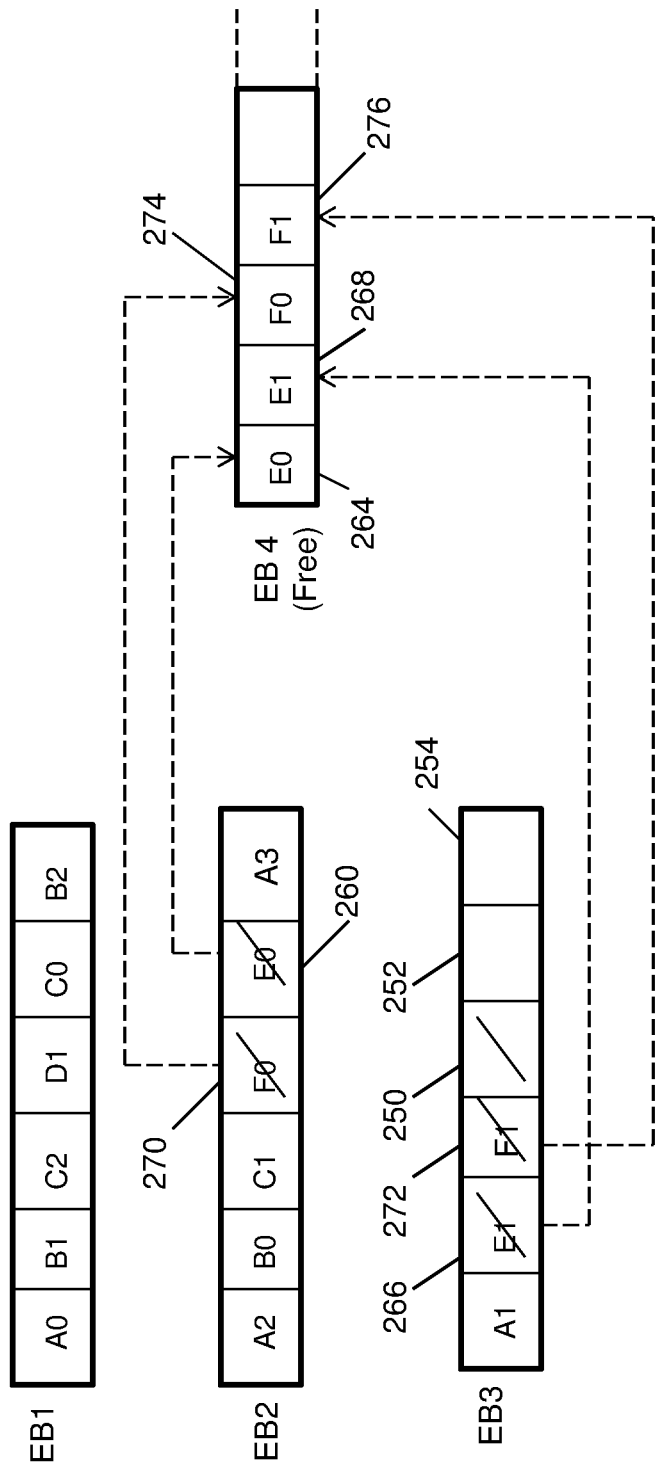
FIG. 4 is a diagrammatic view that illustrates an example of the selection and reorganization process of FIG. 3.

FIG. 3 is a flow diagram that illustrates an embodiment of a reorganization process 200 in accordance with the invention for efficiently selecting objects to move to minimize costs and free erase blocks quickly, and FIG. 4 is a diagrammatic view that illustrates an example of that process.

In a flash memory system, there is a plurality of erase blocks containing various amounts of valid data (numbers of active MUs) for various different objects. In order to free up space as quickly as possible at the least cost, the invention looks for erase blocks that are either empty or close to being empty because they require less copying to empty and use less capacity of pre-erased blocks for the copied data. This approach makes the most progress at the least cost in reorganizing the memory. The process of FIG. 3 is iterative. It tests different objects to determine the most cost-effective ones to move and selects the order in which to move them.

Referring to FIG. 3, the process may begin by inspecting the erase blocks in flash, and at 204 by selecting a candidate object for a move to a free erase block. The selected candidate object may be one in a block which has the fewest numbers of objects and/or the lowest or close to the lowest count of valid MUs, for example. At 206 the cost of moving that candidate object is determined. The cost for moving the candidate object is determined by the number and size of MU moves necessary to move that object to a free erase block, i.e., the count of the number of valid MUs which must be moved times the size of the object's MUs. At 208, the process determines how full each block would be if only that candidate object were moved. In other words, the process determines at 208 how much progress would be made in emptying one or more blocks by moving the object. At 210, if it is decided that another candidate object should be selected, the process loops back to step 204 and repeats for another selected object. Otherwise, at step 212, the process selects an object for movement based upon the determinations of step 208 that result in a block being the least full. If there is a tie between two or more objects that produce the same results, at step 214 the object that has the least cost to move may be selected as the optimal one to move.

The system may store the results of the move costs and fullness determinations made at steps 206 and 208, and of the optimal order of selection of objects made at steps 212 and 214 using the fullness and cost determinations. At step 216, the selected object may be moved to the free erase block by moving its MUs in order to the new erase block to form a new extent. Next, at 218, a determination is made as to whether moving of that selected object results in any blocks being left empty (having no valid MUs). If so, at 220 the empty blocks are erased. If it is determined at step 218 that no blocks are left empty by moving the selected object, the process loops back to step 204 and repeats. Following step 220, a decision is made at step 222 as to whether enough blocks have been erased. If so, the process may end at 224. Otherwise, the process may loop back to step 204 and repeat.

FIG. 4 gives an example that is useful for illustrating the process of FIG. 3. Assuming, as shown in FIG. 4, that the flash memory has three erase blocks EB1, EB2 and EB3, each of which stores different MUs of objects A, B, C, D, E and F. Erase block EB1, for instance, may store MUs A0, B1, C2, D1, C0 and B2 of four objects A, B, C and D, as shown. Similarly, EB2 stores MUs A2, B0, C1, F0, E0 and A3 of five objects A, B, C, F and E, and EB3 stores MUs A1, E1 and F1, of three objects A, E and F. The slash ("/") shown at 250 in EB3 indicates that the MU stored at location 250 is no longer valid, and the absence of indications in locations 252 and 254 means that these two locations are vacant. Thus, EB1 and EB2 each have six valid MUs and EB3 has three valid MUs. Since erase block EB3 has the lowest count of valid MUs and objects, it is least full and emptying EB3 will result the fastest progress in freeing an erase block. Thus, an object in EB3 may be selected for emptying first (FIG. 3, 212). This may be accomplished by moving (copying) the three MUs of EB3 to one or more free erase blocks. In the example shown in FIG. 4, there is one free erase block EB4. To empty EB3, the MUs of objects A, E and F must be moved. As previously described, the objective of reorganizing objects spread among various erase blocks is to create extents of object MUs in order and to free erase blocks for reuse. Since EB3 has one MU of each of three different objects A, E and F, moving the single MU of any of these objects from EB3 would have the same effect in reducing the size of EB3, i.e., there is a tie among the three objects in producing the least full block (FIG. 3, step 214). The cost in moving object A is four since four valid MUs (A0, A1, A2 and A3) of object A must be moved, whereas the cost of moving objects E and F is two since they each have only two valid MUs to move. Thus, one of objects E or F may be selected to move first. Assuming that object E is selected to be moved from EB3, this requires that MUs E0 (from EB2) and E1 (from EB3) be moved, in that order, to EB4. Thus, E0 is moved first from location 260 of EB1 to location 264 of EB4, as indicated by the dotted line in the figure, and next, E1 is moved from location 266 in EB3 to location 268 in EB4, as shown, to complete the movement of object E. After moving E0 in EB2 and E1 in EB3, these MUs are no longer valid in EB2 and EB3, respectively, as indicated by the slashes through these MU at 260 and 266. However, moving object E does not empty any erase block (FIG. 3, step 218). Thus, the process of FIG. 3 is repeated. During the next iteration, object F may be selected to be moved as this results in block EB3 being least full at the lowest cost. Thus, MUs F0 and F1 are moved (in order) from locations 270 of EB2 and 272 of EB3 to locations 274, 276, respectively, of EB4, as indicated, and the original MUs F0 and F1 in blocks EB2 and EB3 are marked as being invalid. This leaves only MU A1 remaining in EB3. Thus, object A is moved next to either EB4 or to another free erase block to free up EB3. After all MUs are moved, erase block EB3 becomes empty and it may be erased for reuse (FIG. 3, step 220).

In the above example, the MUs of objects E and F are moved in order to contiguous locations of free erase block EB4, as shown, as will be the MUs of object A. It will be appreciated, however, that objects E and F could be moved to free locations in other different erase blocks. Upon each MU being moved (copied) to a free erase block, the MU is not actually deleted from its source location in its source erase block (EB1, EB2 or EB3), and the original source location of the MU is not available for reuse until the entire source erase block is erased. Rather, the original source address location in the source erase block is designated as being invalid, as indicated by the slashes through the MUs of objects as shown in the figure, and the starting locations and lengths of the newly created extents of objects E and F in new erase block EB4 are inserted into the extent tree 54 as new mapping data.

As noted above, the movement of objects may be asynchronous to client write operations. Since the error rate for flash increases with the length of time since the flash was first written, data on a flash system is periodically rewritten to refresh it. Rewriting flash data to refresh it may be combined with reorganizing data into contiguous extents, as described, in order to lower the overhead cost of the straightening process. In addition, extent straightening may be combined with normal garbage collection that flash systems need to perform in order to reclaim the used space. Ideally, the reorganization operation described above of moving an object into a small number of contiguous extents can be done in the background as part of the normal/retention refresh or garbage collection processes. Since it is desirable to limit the DRAM used for mapping from logical to physical addresses, if the pool of DRAM becomes exhausted, typically because of too many individual MUs in the override map, the reorganization process of FIGS. 3 and 4 may be initiated when needed and continued until sufficient DRAM is freed. Furthermore, in the event that the reorganization process does not empty erase blocks quickly enough, garbage collection and reorganization may be alternated, since garbage collection will not undo prior straightening due to reorganization since sparse blocks will not have any MUs of reorganized objects.

From the foregoing, it will be appreciated that the invention affords an efficient and cost-effective method for managing flash memory by organizing the memory into extents of contiguous object data, and by providing a tree of extents that map logical to physical addresses of the object data and that minimize the required DRAM for mapping. Additionally, it will also be appreciated that the invention affords an efficient and cost-effective method of reorganizing MUs of object data into extents in order to free erase blocks of flash for reuse.

While the foregoing has been with reference to particular embodiments, it will be appreciated that changes to these embodiments may be made without departing from the principles and the spirit of the invention, the scope of which is defined by the appended claims.

The invention claimed is:

1. In a flash memory system comprising a controller and flash memory that stores object data of a plurality of executing applications as a plurality of managed units ("MUs") of object data distributed non-contiguously in a plurality of erase blocks of said flash memory, a MU comprising an addressable storage location in said flash memory containing a unit of object data of a single one application of said plurality of applications, and an erase block comprising a block said flash memory sized to contain a plurality of MUs of object data of different ones of said applications, a method of managing the flash memory by rearranging valid MUs of valid object data in consecutive order of creation in free erase blocks to empty an erase block of valid object data and reclaim that empty erase block for new object data of said executing applications, comprising:

selecting as a candidate erase block for reclamation an erase block in said flash memory;

determining costs to move directly from said selected candidate erase block to one or more free erase blocks valid MUs of all objects present in said selected candidate erase block and to move directly to said free erase blocks other valid MUs of the same applications which produced said valid MUs present in said selected candidate erase block that are distributed among other ones of said plurality of erase blocks, said determining comprising determining for all of said valid MUs a number and a sequence of said valid MUs of said objects that must be moved to said free erase block from said selected candidate erase block and from said other ones of said plurality of erase blocks in said flash memory to arrange all valid MUs of each application moved to said free erase block in contiguous order of creation by such application in said free erase block to form an extent of contiguous valid MUs of said each object in said free erase block;

repeating said selecting and determining steps for other candidate erase blocks;

selecting from among candidate erase blocks a selected erase block for movement of valid MUs requiring the fewest moves to move all of said valid MUs in said selected erase block and all valid MUs produced by the same executing applications in other erase blocks to a free erase block;

moving from said selected erase block and from said other erase blocks directly to said free erase block said valid MUs in said contiguous order of creation to contiguous storage locations of said free erase block to form said extent without intermediate moves of said valid MUs to a memory external to said flash memory;

determining whether said moving leaves said selected erase block empty of valid MUs; and if not, repeating said foregoing steps until at least one selected erase block is empty of valid MUs.

2. The method of claim 1 wherein said moving comprises reorganizing a selected object into said free erase block by writing individual valid MUs of the selected object directly from one or more of said other ones of said plurality of erase blocks in said contiguous order of creation as said extent of MUs into said free erase block of the flash memory.

3. The method of claim 2, wherein said reorganizing is performed as part of refreshing the contents of said flash memory.

4. The method of claim 1, wherein, upon there being two or more erase blocks having valid MUs of objects of different applications, the movement of which MUs results in said two or more of said blocks being equally less full, the method further comprises selecting first the object to move that has the least cost to move.

5. The method of claim 4, wherein selecting the object that has the least cost to move comprises selecting that object that has the fewest valid MUs to move.

6. The method of claim 4 further comprising erasing said empty erase block for reuse.

7. In a flash memory system comprising a controller and flash memory that stores object data of executing applications as a plurality of managed units ("MUs") of object data distributed non-contiguously in a one or more physical erase blocks of said flash memory, a MU comprising an addressable storage location in said flash memory containing a unit of object data of a single one executing application, and an erase block comprising a block of said flash memory sized to contain a plurality of MUs, a method of managing the flash memory by rearranging valid MUs of valid object data into consecutive order of creation in a free erase block directly without the need for intermediate moves of said valid MUs to a memory external to said flash memory to reclaim erase blocks for new object data of said executing applications, comprising:

inspecting a plurality of erase blocks containing MUs of object data for a candidate erase block for movement of MUs of objects to a free erase block, and selecting as a candidate erase block an erase block having valid MUs of the fewest number of objects;

determining costs to move to said free erase block valid MUs of all said objects that have valid MUs present in said selected candidate erase block and to move to said free erase block other valid MUs of such objects distributed among other ones of said plurality of erase blocks, said determining comprising determining for all said valid MUs a number and a sequence of said valid MUs of such objects that must be moved to said free erase block from said selected erase block and from said other ones of said plurality of erase blocks to arrange all valid MUs of such objects that are moved to said free erase block in contiguous order of creation in said free erase block to form an extent of contiguous valid MUs of said object in said free erase block;

said selected candidate erase block having the least cost to move all valid MUs of objects in said selected candidate erase block and all valid MUs of said objects in said other ones of said plurality of erase blocks in said flash memory; and moving directly from said selected candidate erase block and from said plurality of other erase blocks valid non-contiguous MUs of an object, in order of creation by one application, to the free erase block without intermediate moves of said valid MUs to a memory external to said flash memory such that after movement said MUs are stored in said order of creation in contiguous locations in said free erase block.

8. The method of claim 7, wherein upon there being two or more erase blocks having valid MUs, the movement of which results in more than one erase block being equally less full, selecting for movement MUs in an erase block that has the fewest valid MUs.

9. The method of claim 8, wherein said moving comprises moving valid MUs in an order that results in the greatest reductions in the number of MUs in said selected erase block.

10. The method of claim 7, wherein said moving comprises moving a plurality of individual valid MUs in order of creation from said selected and said plurality of erase blocks of said flash memory to said free erase block of said flash memory to create an extent of contiguous MUs, and storing in an extent tree mapping data comprising a starting address and a length for said extent.

11. The method of claim 7, wherein said flash memory system further comprises program memory that stores computer readable executable instructions for controlling said controller to perform said method.

12. The method of claim 11, wherein said computer readable executable instructions further control said controller to select objects asynchronously with applications writing MUs to said flash memory by iteratively moving in order of creation individual MUs of said objects from source erase blocks to one or more free erase blocks to create extents of contiguous MUs in said free erase blocks, and to erase a source erase block for reuse upon all valid MUs being moved from said source erase block.

13. The method of claim 7 further comprising erasing said selected erase block if said selected erase block is empty following movement of said valid MUs.

\* \* \* \* \*